(12) United States Patent
Zhao et al.

(10) Patent No.: US 11,537,023 B2
(45) Date of Patent: Dec. 27, 2022

(54) LIQUID CRYSTAL CELL AND ELECTRONIC DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhiqiang Zhao, Beijing (CN); Hongliang Yuan, Beijing (CN); Xiaojuan Wu, Beijing (CN); Qi Zheng, Beijing (CN); Yao Bi, Beijing (CN); Xuan Zhong, Beijing (CN); Zhangxiang Cheng, Beijing (CN); Jiaxing Wang, Beijing (CN); Donghua Zhang, Beijing (CN); Baoqing Hou, Beijing (CN); Lei Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/431,671

(22) PCT Filed: Dec. 22, 2020

(86) PCT No.: PCT/CN2020/138175
§ 371 (c)(1),
(2) Date: Aug. 17, 2021

(87) PCT Pub. No.: WO2021/136008
PCT Pub. Date: Jul. 8, 2021

(65) Prior Publication Data
US 2022/0146898 A1 May 12, 2022

(30) Foreign Application Priority Data

Jan. 2, 2020 (CN) .......................... 202010003306.8

(51) Int. Cl.
*G02F 1/163* (2006.01)
*G02F 1/1337* (2006.01)
(Continued)

(52) U.S. Cl.
CPC .......... *G02F 1/163* (2013.01); *G02F 1/13394* (2013.01); *G02F 1/133784* (2013.01);
(Continued)

(58) Field of Classification Search
None
See application file for complete search history.

(56) References Cited

U.S. PATENT DOCUMENTS

2007/0229421 A1* 10/2007 Sumiyoshi ............ G02F 1/1323
345/87
2012/0154892 A1 6/2012 Yashiro et al.
(Continued)

FOREIGN PATENT DOCUMENTS

CN 101042489 A 9/2007
CN 106019756 A 10/2016
(Continued)

OTHER PUBLICATIONS

The First Office Action of priority application No. CN 202010003306.8 issued by the China Patent Office dated Feb. 2, 2021.

*Primary Examiner* — Ryan Crockett
(74) *Attorney, Agent, or Firm* — IP & T Group LLP (57) ABSTRACT

A liquid crystal cell includes a first substrate, a second substrate and a liquid crystal layer disposed between the first substrate and the second substrate. The first substrate includes a first base, and an electrochromic layer disposed (Continued)

on a side of the first base. The second substrate includes a second base, and a plurality of spacers arranged at intervals and disposed on a side of the second base proximate to the first substrate. An orthographic projection of at least one spacer of the plurality of spacers arranged at intervals on the first base is within a range of an orthographic projection of the electrochromic layer on the first base.

14 Claims, 7 Drawing Sheets

(51) Int. Cl.
    *G02F 1/1339*     (2006.01)
    *G02F 1/1343*     (2006.01)
    *G02F 1/155*     (2006.01)
    *G02F 1/1347*     (2006.01)

(52) U.S. Cl.
    CPC ........ *G02F 1/134309* (2013.01); *G02F 1/155* (2013.01); *G02F 1/1347* (2013.01); *G02F 2201/44* (2013.01); *G02F 2202/04* (2013.01)

(56) References Cited

U.S. PATENT DOCUMENTS

| | | | | |
|---|---|---|---|---|
| 2013/0222748 | A1* | 8/2013 | Zhou | G02F 1/133512 |
| | | | | 349/110 |
| 2016/0145493 | A1* | 5/2016 | Zheng | C09K 19/601 |
| | | | | 252/299.1 |
| 2018/0286335 | A1* | 10/2018 | Zhu | G02F 1/136213 |
| 2019/0285959 | A1 | 9/2019 | Guo et al. | |
| 2020/0401009 | A1* | 12/2020 | Chung | G02F 1/153 |

FOREIGN PATENT DOCUMENTS

| | | | |
|---|---|---|---|
| CN | 106647050 A | | 5/2017 |
| CN | 106773183 A | * | 5/2017 |
| CN | 107425043 A | | 12/2017 |
| CN | 108490701 A | | 9/2018 |
| CN | 109116620 A | | 1/2019 |
| CN | 110286527 A | | 9/2019 |
| CN | 111025778 A | | 4/2020 |

* cited by examiner

LIQUID CRYSTAL CELL AND ELECTRONIC DEVICE

CROSS-REFERENCE TO RELATED APPLICATIONS

This application is a national phase entry under 35 USC 371 of International Patent Application No. PCT/CN2020/138175 filed on Dec. 22, 2020, which claims priority to Chinese Patent Application No. 202010003306.8, filed on Jan. 2, 2020, which are incorporated herein by reference in their entirety.

TECHNICAL FIELD

The present disclosure relates to the field of display technologies, and in particular, to a liquid crystal cell and an electronic device.

BACKGROUND

At present, electronic devices have a wide range of application prospects. For example, dimming glass may be used in transportation windows of vehicles such as automobiles, airplanes, or high-speed railways, as well as architectural glass, conference room partitions, or so on.

SUMMARY

In one aspect, a liquid crystal cell includes a first substrate, a second substrate, and a liquid crystal layer disposed between the first substrate and the second substrate. The first substrate includes a first base, and an electrochromic layer disposed on a side of the first base. The second substrate includes a second base, and a plurality of spacers arranged at intervals and disposed on a side of the second base proximate to the first substrate. An orthographic projection of at least one spacer of the plurality of spacers arranged at intervals on the first base is within a range of an orthographic projection of the electrochromic layer on the first base.

In some embodiments, the first substrate further includes a first electrode and a second electrode in different layers and insulated from each other. The first electrode is disposed on a side of the electrochromic layer proximate to the second substrate. The second electrode is disposed on a side of the electrochromic layer away from the second substrate. Orthographic projections of the first electrode and the second electrode on the first base overlap. The second substrate further includes a third electrode. Orthographic projections of the third electrode and the first electrode on the first base overlap.

In some embodiments, an orthographic projection of the second electrode on the first base is within a range of an orthographic projection of the first electrode on the first base.

In some embodiments, the second electrode includes a plurality of sub-electrodes arranged at intervals.

In some embodiments, an orthographic projection of each spacer on the first base is within a range of an orthographic projection of one sub-electrode on the first base.

In some embodiments, the electrochromic layer includes an electrolytic sub-layer and a color changing sub-layer arranged in different layers. An orthographic projection of the color changing sub-layer on the first base is within a range of an orthographic projection of the electrolytic sub-layer on the first base.

In some embodiments, the color changing sub-layer includes a plurality of color changing blocks arranged at intervals. An orthographic projection of each spacer on the first base is within a range of an orthographic projection of one color changing block on the first base.

In some embodiments, the electrolytic sub-layer includes a plurality of electrolytic blocks arranged at intervals. The color changing sub-layer includes a plurality of color changing blocks arranged at intervals. An orthographic projection of each color changing block on the first base is within a range of an orthographic projection of one electrolytic block on the first base. An orthographic projection of each spacer on the first base is within a range of an orthographic projection of one color changing block on the first base.

In some embodiments, the color changing sub-layer is disposed on a side of the electrolytic sub-layer away from the first base.

In some embodiments, the first substrate further includes a first alignment layer. The first alignment layer has a first rubbing alignment direction. The second substrate further includes a second alignment layer. The second alignment layer has a second rubbing alignment direction. The first rubbing alignment direction is parallel to the second rubbing alignment direction.

In some embodiments, an orthographic projection of a surface of the spacer proximate to the second base on the first substrate forms a first region. The orthographic projection of the color changing block on the first base includes a first edge and a second edge that are opposite to each other in the second rubbing alignment direction. A first distance, in the second rubbing alignment direction, between a first point on the first edge and the first region is less than a second distance, in the second rubbing alignment direction, between a second point on the second edge and the first region. A line connecting the first point and the second point is parallel to the second rubbing alignment direction.

In some embodiments, the orthographic projection of the color changing block on the first base further includes a third edge and a fourth edge that are opposite to each other in a direction perpendicular to the second rubbing alignment direction. A third distance, in the direction perpendicular to the second rubbing alignment direction, between a third point on the third edge and the first region is equal to a fourth distance, in the direction perpendicular to the second rubbing alignment direction, between a fourth point on the fourth edge and the first region; A line connecting the third point and the fourth point is perpendicular to the second rubbing alignment direction.

In some embodiments, an orthographic projection of a surface of the spacer away from the second base on the first base forms a second region. An area of the second region is less than or equal to an area of the first region. The second region includes a fifth edge and a sixth edge that are opposite to each other in the second rubbing alignment direction. The first distance is greater than or equal to half of a fifth distance, in the second rubbing alignment direction, between a fifth point on the fifth edge and the sixth edge, and is less than or equal to the fifth distance. The fifth point, the first point, and the second point are on a same straight line. The second distance is greater than or equal to the fifth distance, and is less than or equal to 1.5 times the fifth distance.

In some embodiments, the second region further includes a seventh edge and an eighth edge that are opposite to each other in the direction perpendicular to the second rubbing alignment direction. The third distance is greater than or equal to half of a sixth distance, in the direction perpendicular to the second rubbing alignment direction, between a sixth point on the seventh edge and the eighth edge, and is less than or equal to the sixth distance. The sixth point, the third point and the fourth point are on a same straight line.

In some embodiments, the liquid crystal layer includes dichroic dyes and liquid crystal molecules.

In some embodiments, the liquid crystal layer further includes a chiral agent.

In another aspect, an electronic device is provided. The electronic device includes at least one liquid crystal cell of any one of the above embodiments.

In some embodiments, the at least one liquid crystal cell includes one liquid crystal cell. A liquid crystal layer in the liquid crystal cell includes dichroic dyes, liquid crystal molecules and a chiral agent.

In some embodiments, the at least one liquid crystal cell includes two liquid crystal cells arranged in a stack. In each liquid crystal cell of the two liquid crystal cells, a first substrate includes a first alignment layer, the first alignment layer has a first rubbing alignment direction, and a second substrate includes a second alignment layer, the second alignment layer has a second rubbing alignment direction. The first rubbing alignment direction of the first alignment layer in the liquid crystal cell is parallel to the second rubbing alignment direction of the second alignment layer. A first rubbing alignment direction of a first alignment layer of one liquid crystal cell is perpendicular to a first rubbing alignment direction of a first alignment layer of another liquid crystal cell.

In some embodiments, a liquid crystal layer in the liquid crystal cell includes dichroic dyes and liquid crystal molecules.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, but are not limitations on actual sizes of products, an actual process of a method and an actual timing of signals to which the embodiments of the present disclosure relate.

DETAILED DESCRIPTION

Technical solutions in some embodiments of the present disclosure will be described clearly and completely below with reference to the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Below, the terms "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

The term "same layer" refers to a layer structure formed by performing a patterning process on a film layer, formed by a same film-forming process and used for forming specific patterns, by using the same mask. The patterning process may include exposure, development and etching processes, and the specific patterns in the formed layer structure may be continuous or discontinuous, and these specific patterns may also be at different heights or have different thicknesses.

In describing some embodiments, the term "connected" and its derivative expressions may be used. For example, the term "connected" may be used in the description of some embodiments to indicate that two or more components are in direct physical contact or electrical contact with each other. However, the term "connected" and its derivative expressions may also mean that two or more components are not in direct contact with each other but still cooperate or interact with each other. The embodiments disclosed herein are not necessarily limited to the contents herein.

It will be understood that, when a layer or element is referred to as being on another layer or substrate, it may be directly on the another layer or substrate, or intervening layer(s) may also be present.

In addition, the use of the phrase "based on" is meant to be open and inclusive, since a process, step, calculation or other action that is "based on" one or more of the stated conditions or values may, in practice, be based on additional conditions or values exceeding those stated.

Exemplary embodiments are described herein with reference to sectional views and/or plan views as idealized exemplary drawings. In the accompanying drawings, thicknesses of layers and regions are enlarged for clarity. Exemplary embodiments of the present disclosure should not be construed to be limited to shapes of regions shown herein, but to include deviations in shape due to, for example, manufacturing. For example, an etched region shown as a rectangle generally has a curved feature. Therefore, the regions shown in the accompanying drawings are schematic in nature, and their shapes are not intended to show actual shapes of the region in a device, and are not intended to limit the scope of the exemplary embodiments.

When an electronic device includes liquid crystal, due to a large size of a liquid crystal cell and the electronic device, spacers are required to support the liquid crystal cell. However, whether spherical spacers (ball spacers) or columnar spacers (post spacers), due to a rubbing alignment problem, the spacers cause a certain range of light leakage in a direction of a rubbing alignment. Therefore, the electronic device shows a certain density of white dots in a black picture, which seriously affects users's visual experience. If a black matrix is used to shield light leakage regions, although a light leakage problem may be solved, a certain density of black dots will be generated in a white picture of a dimming glass (e.g., the electronic device), which will still affect the visual experience.

Figure 1:
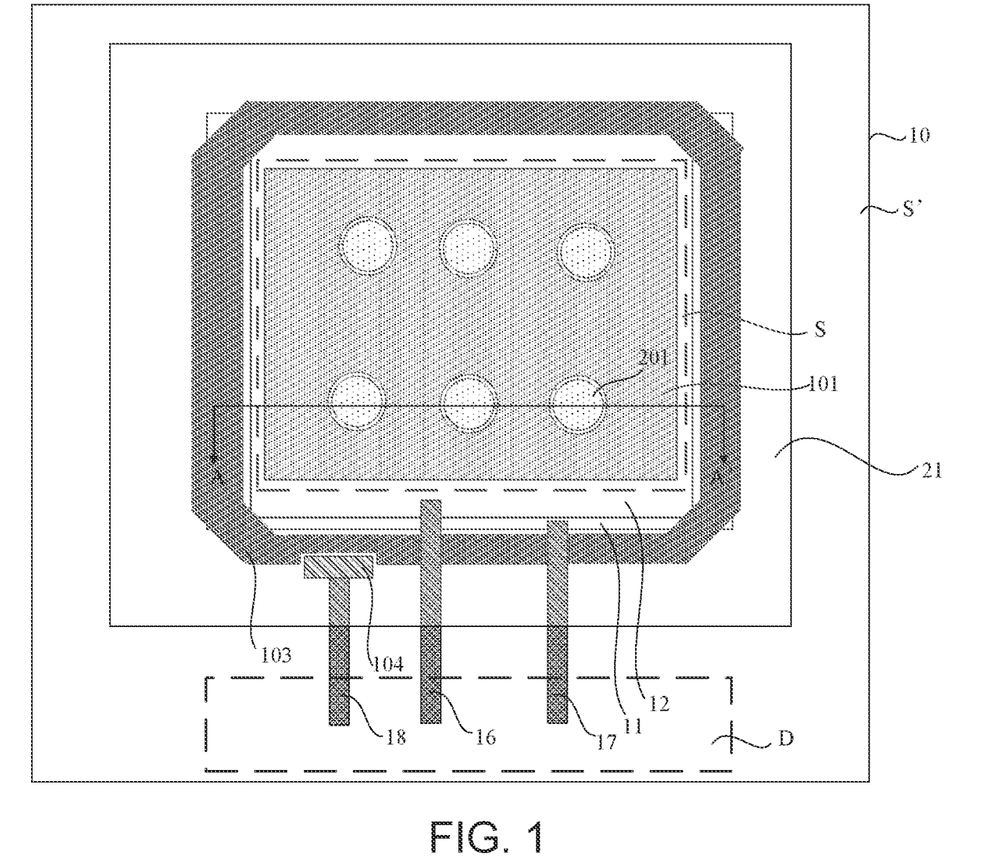
FIG. 1 is a top view showing a structure of a liquid crystal cell, in accordance with some embodiments.
Figure 2:
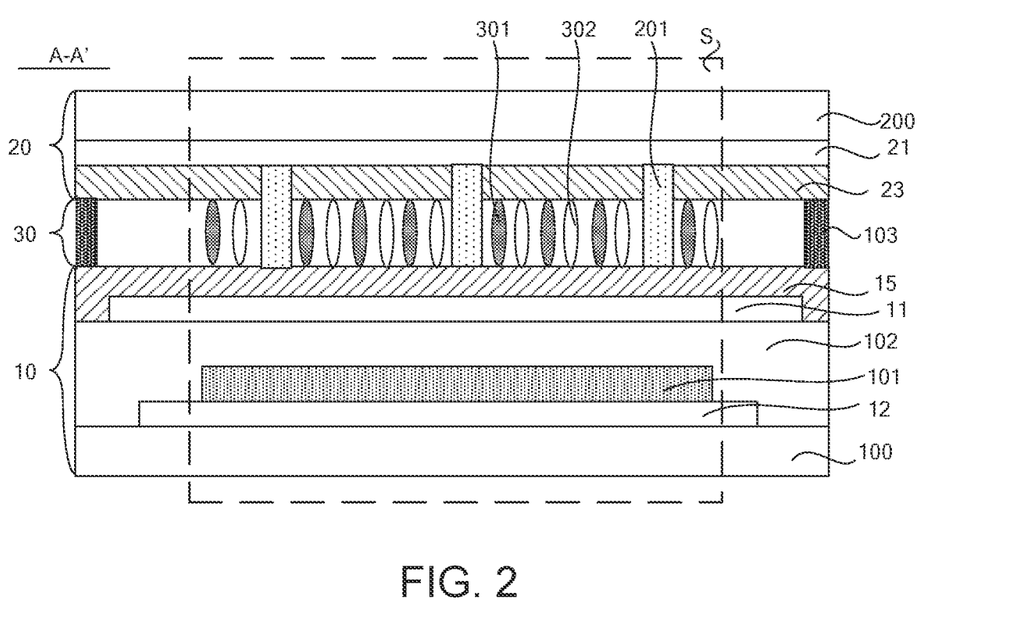
FIG. 2 is a sectional view of the liquid crystal cell in FIG. 1 taken along the A-A' line.

Some embodiments of the present disclosure provide a liquid crystal cell. As shown in FIGS. 1 and 2, the liquid crystal cell includes a first substrate 10, a second substrate 20 disposed opposite to the first substrate 10, and a liquid crystal layer 30 disposed between the first substrate 10 and the second substrate 20.

The first substrate 10 includes a first base 100 and an electrochromic layer 101 disposed on a side of the first base 100 proximate to the second substrate 20. The second substrate 20 includes a second base 200 and a plurality of spacers 201 arranged at intervals on a side of the second base 200 proximate to the first substrate 10.

The electrochromic layer 101 changes color due to an action of an electric field. For example, the electrochromic layer 101 is black due to the action of the electric field, and becomes transparent due to an action of a reverse electric field with respect to the electric field.

In some examples, the electrochromic layer is made of an electrochromic material, which may undergo a stable and reversible color change due to an action of an external electric field, so that the electrochromic layer appears as a reversible change in color and transparency in appearance.

For example, the electrochromic layer 101 becomes black due to the action of an electric field to block an incident light from a side of the first substrate 10 away from the second substrate 20, so that the incident light cannot pass through the black electrochromic layer 101. As another example, the electrochromic layer 101 becomes transparent due to an action of another electric field, so that an incident light from a side of the first substrate 10 away from the second substrate 20 can pass through the electrochromic layer 101 in the first substrate 10 and be directed toward the second substrate 20. An orthographic projection of at least one spacer 201 of the plurality of spacers 201 arranged at intervals on the first base 100 is within a range of an orthographic projection of the electrochromic layer 101 on the first base 100.

In some examples, the spacer 201 has a columnar shape. A manufacturing process of a columnar spacer 201 includes: a material to be formed of the spacer 201 is deposited on the side of the second base 200 proximate to the first substrate 10, and then the spacer 201 is obtained after exposure, development, and etching. Therefore, a position of the columnar spacer in the second substrate 20 is fixed unchangeably compared to a spherical spacer.

For example, the spacer 201 is in a shape of a cylinder, a hexagonal prism, etc. The embodiments of the present disclosure does not limit a specific shape of the spacer 201. As long as the spacer 201 disposed in the second substrate 20 protrudes toward the first substrate 10, all may serve as the columnar spacer 201.

In some examples, a material of the spacer 201 is a transparent resin material.

In the liquid crystal cell of some embodiments of the present disclosure, an orthographic projection of at least one spacer 201 on the first base 100 is within the range of the orthographic projection of the electrochromic layer 101 on the first base 100. Based on this, the electrochromic layer 101 becomes black due to the action of the electric field, so that the incident light from the side of the first substrate 10 away from the second substrate 20 cannot pass through the electrochromic layer 101 to be incident onto the spacer 201. Therefore, light leakage at the spacer 201 is avoided, and a display effect is improved.

In some embodiments, as shown in FIG. 2, the first substrate 10 further includes a first electrode 11 and a second electrode 12 in different layers and insulated from each other. The first electrode 11 is disposed on a side of the electrochromic layer 101 proximate to the second substrate 20. The second electrode 12 is disposed on a side of the electrochromic layer 101 away from the second substrate 20. Different layers can be understood as being stacked. Herein, the first electrode 11 and the second electrode 12 are in different layers and insulated from each other. That is, the first electrode 11 and the second electrode 12 are stacked and insulated from each other.

Orthographic projections of the first electrode 11 and the second electrode 12 on the first base 100 overlap, and the orthographic projection of the electrochromic layer 101 on the first base 100 is within a range of the orthographic projections of the first electrode 11 and the second electrode 12 on the first base 100, so that the first electrode 11 and the second electrode 12 may form an electric field that controls the electrochromic layer 101.

In some examples, voltages are respectively applied to the first electrode 11 and the second electrode 12, and a value of a voltage applied to the first electrode 11 is greater than a value of a voltage applied to the second electrode 12, so that a direction of an electric field formed between the first electrode 11 and the second electrode 12 is from the first electrode 11 to the second electrode 12. In this case, the electrochromic layer 101 becomes black due to an action of the electric field. A value of the voltage applied to the first electrode 11 is less than a value of the voltage applied to the second electrode 12, so that a direction of an electric field formed between the first electrode 11 and the second electrode 12 is from the second electrode 12 to the first electrode 11. In this case, the electrochromic layer 101 becomes transparent due to an action of the electric field.

In some other examples, voltages are respectively applied to the first electrode 11 and the second electrode 12, and a value of a voltage applied to the first electrode 11 is greater than a value of a voltage applied to the second electrode 12, so that a direction of an electric field formed between the first electrode 11 and the second electrode 12 is from the first electrode 11 to the second electrode 12. In this case, the electrochromic layer 101 becomes transparent due to an action of the electric field. A value of a voltage applied to the first electrode 11 is less than a value of a voltage applied to the second electrode 12, so that a direction of an electric field formed between the first electrode 11 and the second electrode 12 is from the second electrode 12 to the first electrode 11. In this case, the electrochromic layer 101 becomes black due to the action of the electric field.

In some examples, after a color of the electrochromic layer 101 changes due to the action of the electric field, the electrochromic layer 101 can remain its changed color due to the action of the electric field when the electric field is removed. For example, after the electrochromic layer 101 becomes black due to an action of an electric field, the electrochromic layer 101 can still remain black when the electric field is removed. As another example, after the electrochromic layer 101 becomes transparent due to an action of another electric field, the electrochromic layer 101 can remain transparent when the electric field is removed. Therefore, it only need to apply the electric field to the electrochromic layer 101 for a period of time to cause the color of the electrochromic layer 101 be changed accordingly, the electric field may be removed, thereby saving power consumption.

The second substrate 20 further includes a third electrode 21 disposed on a side of the second base 200 proximate to the first substrate 10. Orthographic projections of the third electrode 21 and the first electrode 11 on the first base 200 overlap, and an orthographic projection of the liquid crystal layer on the first base 200 is within a range of the orthographic projections of the third electrode 21 and the first electrode 11 on the first base 200, so that the third electrode 21 and the first electrode 11 may form an electric field that controls the liquid crystal layer 30.

In some embodiments, the liquid crystal layer 30 includes liquid crystal molecules 302 and dichroic dyes 301. In this way, the liquid crystal molecules 302 in the liquid crystal layer 30 rotate under a control of an electric field formed by the third electrode 21 and the first electrode 11. In addition, the dichroic dyes 301 will also rotate at a corresponding angle along with a rotation of the liquid crystal molecules 302.

For example, the dichroic dyes 301 are black dichroic dyes.

Considering an example in which the liquid crystal cell applied to an electronic device, and the electronic device adopts a vertical alignment (VA) type normally white display mode, when no voltage is applied to the third electrode 21 and the first electrode 11, the liquid crystal molecules 302 in the liquid crystal layer 30 are arranged in a direction perpendicular to the first substrate 10 and the second substrate 20, and the incident light from the side of the first substrate 10 away from the second substrate 20 can pass through the liquid crystal layer, so that the electronic device may display a white image.

For example, a direct-current (DC) low-level signal is applied to the first electrode 11. Different voltage signals are applied to the second electrode 12 and the third electrode 21 respectively. Thus, an electric field formed by the first electrode 11 and the second electrode 12 controls the electrochromic layer 101 to become black. Moreover, an electric field formed by the third electrode 21 and the first electrode 11 controls rotation of the dichroic dyes 301 and the liquid crystal molecules 302 in the liquid crystal layer 30, so that the dichroic dyes 301 and the liquid crystal molecules 302 are arranged in a direction parallel to the first substrate 10. In this way, the incident light directed toward the black electrochromic layer 101 is blocked and cannot enter the liquid crystal layer 30 through the electrochromic layer 101. After another portion of the incident light not directed toward the electrochromic layer 101 enters the liquid crystal layer 30, according to a principle of dichroism, when a polarization direction of the incident light is parallel to a long axis direction of the dichroic dyes 301 and the liquid crystal molecules 302, the incident light is absorbed by the liquid crystal layer 30; and when the polarization direction of the incident light is perpendicular to the long axis direction of the dichroic dyes 301 and the liquid crystal molecules 302, the incident light is not absorbed by the liquid crystal layer 30. For example, when the dichroic dyes 301 are black dichroic dyes, when the polarization direction of the incident light is parallel to the long axis direction of the liquid crystal molecules 302, the incident light is absorbed by the black dichroic dyes, and the electronic device displays a black image.

On this basis, the DC low-level signal is still applied to the first electrode 11, and the voltage signal applied to the second electrode 12 is changed, so that the first electrode 11 and the second electrode 12 form another electric field to control the electrochromic layer 101 to become transparent. Moreover, no voltage signal is applied to the third electrode 21, that is, the third electrode 21 and the first electrode 11 do not form an electric field. In this way, the liquid crystal molecules 302 in the liquid crystal layer 30 are arranged in the direction perpendicular to the first substrate 10 and the second substrate 20. After the incident light passes through the electrochromic layer 101 and enters the liquid crystal layer 30, since the polarization direction of the incident light is perpendicular to the long axis direction of the liquid crystal molecules 302, the incident light is not absorbed by the black dichroic dyes, so that light transmitted in the direction perpendicular to the first substrate 10 is transmitted through. Therefore, the electronic device changes from displaying the black image to the white image.

For example, when the voltage applied to the first electrode 11 does not change, a square wave signal with alternating high and low levels may be applied to the third electrode 21, and absolute values of the high and low levels are the same, so as to avoid a polarization phenomenon of the liquid crystal molecules 302 being driven by a fixed electric field for a long time. For example, the voltage applied to the first electrode 11 is 0V. The voltage applied to the third electrode 21 may be a high-level signal for a period of time, a voltage range of which may be from 18V to 22V. The voltage applied to the third electrode 21 is turned into a low-level signal in a next period of time, a voltage range of which may be from −18V to −22V. For example, a square wave signal with alternating voltages of 20V and −20V may be applied to the third electrode 21.

In some examples, the first electrode 11, the second electrode 12 and the third electrode 21 each have a plate-shaped structure. The third electrode 21 covers the second base 200 of the second substrate 20.

In some examples, the first electrode 11, the second electrode 12, and the third electrode 21 each are made of a transparent conductive material, such as indium tin oxide (ITO), which allows the incident light to pass through the first electrode 11, the second electrode 12, and the third electrode 21, so as to avoid a blocking of incident light by these electrodes.

In some examples, as shown in FIG. 2, an orthographic projection of the second electrode 12 on the first base 100 is within a range of an orthographic projection of the first electrode 11 on the first base 100. In this way, it may be avoided that the electric field formed by the first electrode 11 and the second electrode 12 interferes with the electric field formed by the third electrode 23 and the first electrode 11, and affects a working state of the liquid crystal layer 30.

In some examples, the orthographic projection of the first electrode 11 on the first base 100 is within a range of an orthographic projection of the third electrode 23 on the first base 100.

In some examples, since the color of the electrochromic layer 101 changes due to the action of an electric field, the electrochromic layer 101 may remain its color changed due to the action of the electric field when the electric field is removed. Therefore, after applying an electric field to the first electrode 11 and the second electrode 12 to make the electrochromic layer 101 black or transparent, a voltage applied to the second electrode 12 may be removed, so that no electric field is formed between the first electrode 11 and the second electrode 12. That is, it will not affect an electric field formed by the first electrode 11 and the third electrode 21.

In some examples, as shown in FIG. 2, the first substrate 10 further includes an insulating layer 102 located between the first electrode 11 and the electroluminescent layer 101. For example, a material of the insulating layer 102 may be an inorganic material, such as silicon nitride (SiNx).

For example, the insulating layer 102 has a via. The first electrode 11 is electrically connected to a first signal line through the via. It can be understood that the insulating layer 102 may have a single-layer structure, such as a silicon nitride film or an organic insulating film, or a multi-layer structure, such as a composite structure of a silicon nitride film and a silicon oxide film.

Figure 3:
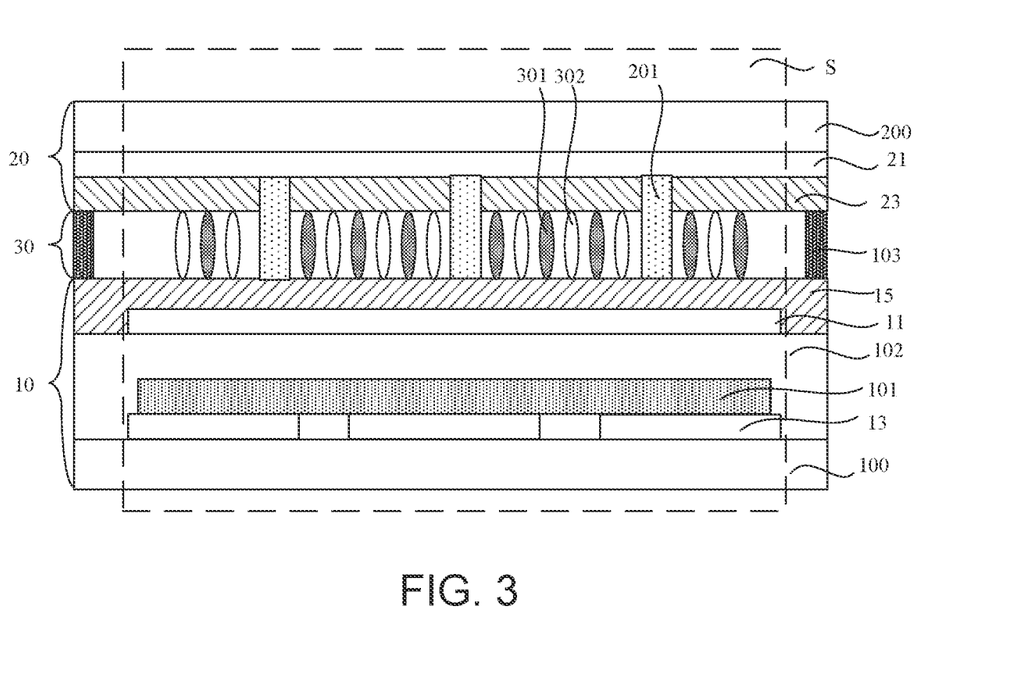
FIG. 3 is a sectional view showing a structure of a liquid crystal cell, in accordance with some embodiments.

In some examples, as shown in FIG. 3, the second electrode 12 includes a plurality of sub-electrodes 13 arranged at intervals. In this way, the electrochromic layer 101 is located between the plurality of sub-electrodes 13 arranged at intervals and the first electrode 11. In addition, the electric field cannot be generated between a gap between adjacent sub-electrodes 13 and the first electrode 11, or due to an influence of the electric field generated between the adjacent sub-electrodes 13 and the first electrode 11, an electric field of very small intensity is generated between the gap and the first electrode 11, which may be ignored. Therefore, each sub-electrode 13 and the first electrode 11 form an electric field that controls a portion of the electrochromic layer 101. That is, an electric field formed by the sub-electrode 13 and the first electrode 11 can only change a color of the portion of the electrochromic layer 101, such as black or transparent. A remaining portion does not change color, or a degree of color change is very small, which may be ignored.

In some examples, as shown in FIG. 3, an orthographic projection of each spacer 201 on the first base 100 is within a range of an orthographic projection of one sub-electrode 13 on the first base 100.

Voltages are applied to the plurality of sub-electrodes 13 and the first electrode 11, respectively. Herein, applying a voltage to the plurality of sub-electrodes 13 means simultaneously applying a same voltage to the plurality of sub-electrodes 13. In this way, an electric field formed by each sub-electrode 13 and the first electrode 11 turns a portion of the electrochromic layer 101 directly opposite to the sub-electrode 13 in a direction perpendicular to the first base 100 into black, so that a portion of the incident light is blocked and cannot be incident onto the spacer 201. Therefore, the light leakage at the spacer 201 is avoided. In this case, a portion of the incident light can pass through a portion of the electrochromic layer 101 that has not turned black and enter the liquid crystal layer 30. Based on this, voltages are applied to the first electrode 11 and the third electrode 21, so that the electric field formed by the first electrode 11 and the third electrode 21 induces the liquid crystal molecules 302 in the liquid crystal layer 30 to rotate. And the dichroic dyes 301 also rotates along with the rotation of the liquid crystal molecules 302, to absorb a portion of the incident light passing through the electrochromic layer 101, so that the electronic device displays a black image.

Figure 4:
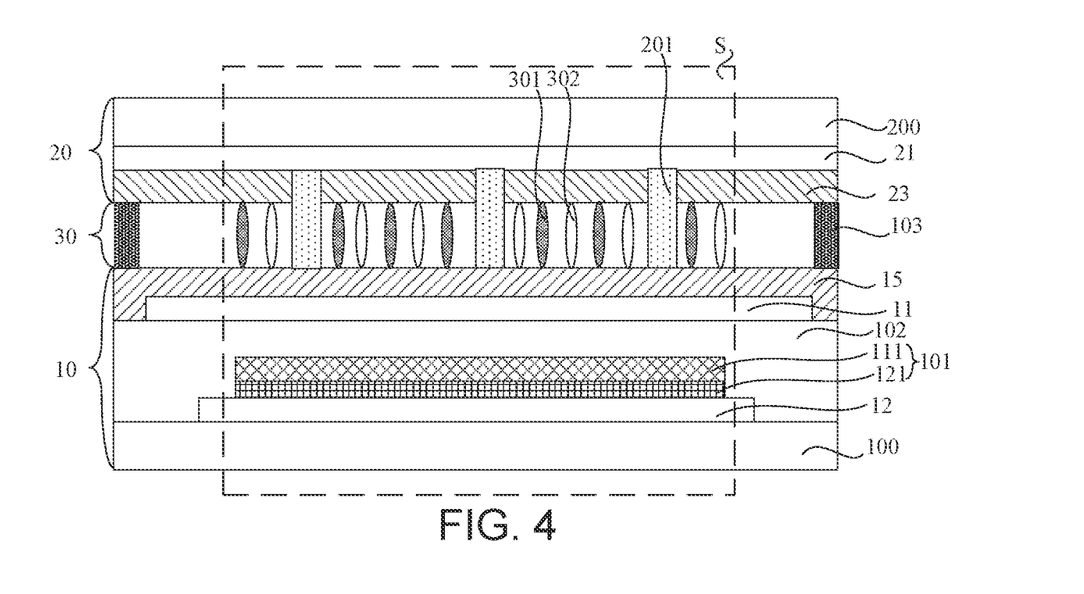
FIG. 4 is a sectional view showing a structure of another liquid crystal cell, according to some embodiments.

In some embodiments, as shown in FIG. 4, the electrochromic layer 101 includes an electrolytic sub-layer 111 and a color changing sub-layer 121 arranged in different layers.

For example, the electrolytic sub-layer 111 is located on a side of the color changing sub-layer 121 proximate to the second substrate 20. As another example, the electrolytic sub-layer 111 is located on a side of the color changing sub-layer 121 away from the second substrate 20.

An orthographic projection of the color changing sub-layer 121 on the first base 100 is within a range of an orthographic projection of the electrolytic sub-layer 111 on the first base 100. In other words, an area of the orthographic projection of the color changing sub-layer 121 on the first base 100 is not greater than an area of the orthographic projection of the electrolytic sub-layer 111 on the first base 100.

For example, a material of the electrolytic sub-layer 111 is a solid electrolyte, such as polyethylene oxide (PEO).

For example, a material of the color changing sub-layer 121 is polyaniline (PANI).

For example, the electrolytic sub-layer 111 is located on the side of the color changing sub-layer 121 away from the second substrate 20. Voltages are applied to the first electrode 11 and the second electrode 12, so that a direction of an electric field formed between the first electrode 11 and the second electrode 12 is directed from the first substrate 10 to the second substrate 20. Due to an action of the electric field, ions released from the electrolytic sub-layer 111 after an electrolysis thereof move to the color changing sub-layer 121, causing the color changing sub-layer 121 to change color, such as black. Another voltages are applied to the first electrode 11 and the second electrode 12, so that a direction of an electric field formed between the first electrode 11 and the second electrode 12 is directed from the second substrate 20 to the first substrate 10. Due to an action of the electric field, the electrolytic sub-layer 111 attracts ions from the color changing sub-layer 121, causing the color changing sub-layer 121 to change color, such as transparent.

Or, as shown in FIG. 4, the electrolytic sub-layer 111 is located on the side of the color changing sub-layer 121 proximate to the second substrate 20. Voltages are applied to the first electrode 11 and the second electrode 12, so that a direction of an electric field formed between the first electrode 11 and the second electrode 12 is directed from the second substrate 20 to the first substrate 10. Due to an action of the electric field, ions released from the electrolytic sub-layer 111 after an electrolysis thereof move to the color changing sub-layer 121, causing the color changing sub-layer 121 to change color, such as black. Another voltages are applied to the first electrode 11 and the second electrode 12, so that a direction of an electric field formed between the first electrode 11 and the second electrode 12 is directed from the first substrate 10 to the second substrate 20. Due to an action of the electric field, the electrolytic sub-layer 111 attracts ions from the color changing sub-layer 121, causing the color changing sub-layer 121 to change color, such as transparent.

Figure 5:
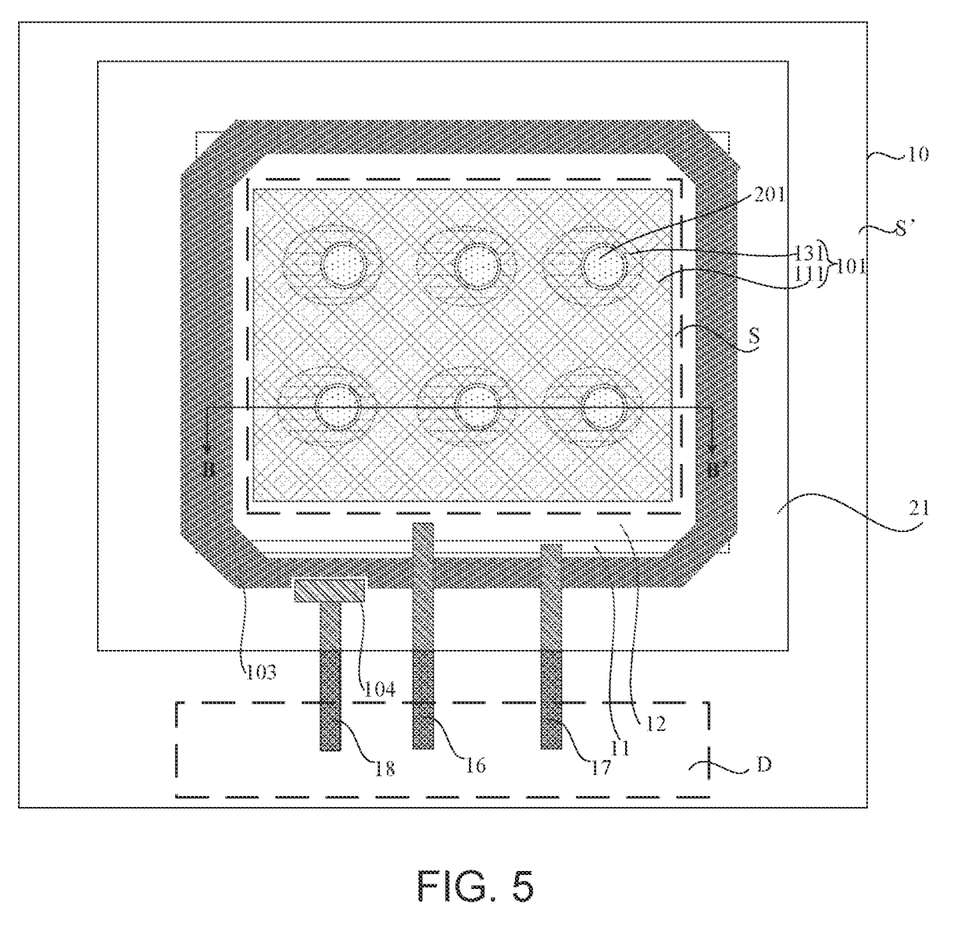
FIG. 5 is a top view showing a structure of another liquid crystal cell, in accordance with some embodiments.
Figure 6:
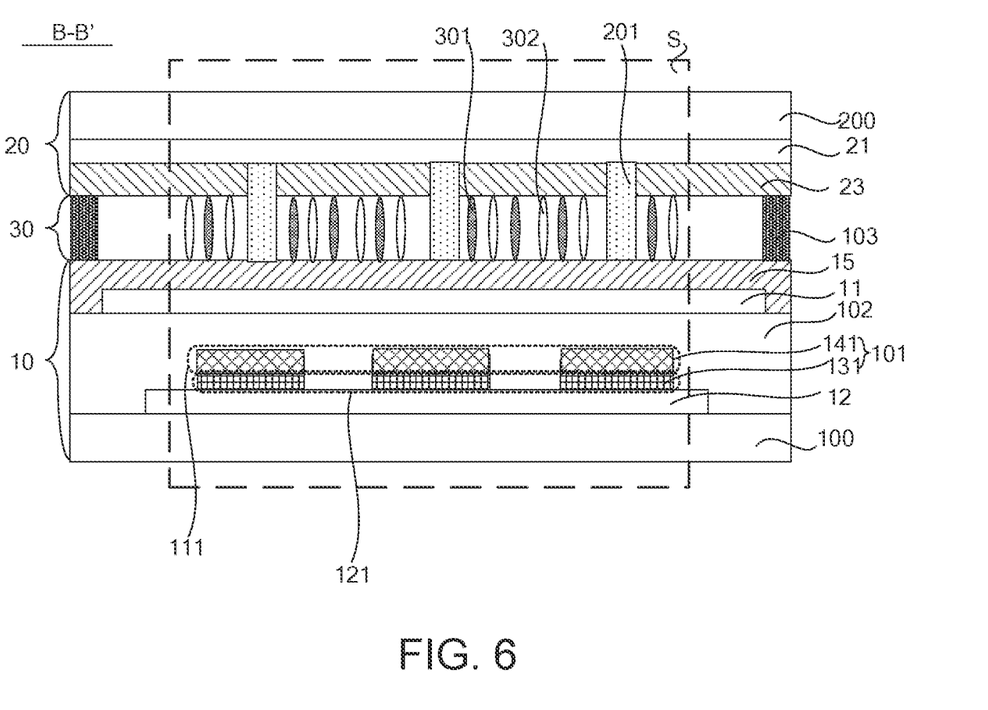
FIG. 6 is a sectional view of the liquid crystal cell in FIG. 5 taken along the B-B' line.

In some examples, as shown in FIGS. 5 and 6, the color changing sub-layer 121 includes a plurality of color changing blocks 131 arranged at intervals.

For example, as shown in FIG. 6, the electrolytic sub-layer 111 is located on a side of the color changing blocks 131 proximate to the second substrate 20. As another example, the electrolytic sub-layer 111 is located on a side of the color changing blocks 131 away from the second substrate 20.

The orthographic projection of each spacer 201 on the first base 100 is within a range of an orthographic projection of one color changing block 131 on the first base 100. For example, one spacer 201 and one color changing block 131 correspond in a direction perpendicular to the first base 100.

For example, a material of the color changing block 131 is polyaniline (PANI).

The electrolytic sub-layer 111 is located on a side of the color changing blocks 131 away from the second substrate 20. The direction of the electric field formed by the first electrode 11 and the second electrode 12 is controlled to be directed from the first substrate 10 to the second substrate 20. Due to the action of the electric field, ions released from the electrolytic sub-layer 111 after the electrolysis thereof move to the color changing blocks 131, causing the color changing blocks 131 to change color, such as black. The direction of the electric field formed between the first electrode 11 and the second electrode 12 is controlled to be directed from the second substrate 20 to the first substrate 10. Due to the action of the electric field, the electrolytic sub-layer 111 attracts ions from the color changing blocks 131, causing the color changing blocks 131 to change color, such as transparent.

Or, as shown in FIG. 6, the electrolytic sub-layer 111 is located on a side of the color changing blocks 131 proximate to the second substrate 20. The direction of the electric field formed by the first electrode 11 and the second electrode 12 is controlled to be directed from the second substrate 20 to the first substrate 10. Due to the action of the electric field, ions released from the electrolytic sub-layer 111 after the electrolysis thereof move to the color changing blocks 131, causing the color changing blocks 131 to change color, such as black. The direction of the electric field formed by the first electrode 11 and the second electrode 12 is controlled to be directed from the first substrate 10 to the second substrate 20. Due to the action of the electric field, the electrolytic sub-layer 111 attracts ions from the color changing blocks 131, causing the color changing blocks 131 to change color, such as transparent.

Based on this, the color changing blocks 131 are black due to the action of the electric field, so that the incident light cannot pass through the color changing blocks 121 to enter the liquid crystal layer. The orthographic projection of each spacer 201 on the first base 100 is within a range of an orthographic projection of one color changing block 131 on the first base 100. Therefore, the incident light cannot be incident onto the spacer 201, which avoids the light leakage at the spacer 201. Moreover, since the plurality of color changing blocks 131 are arranged at intervals and have a one-to-one correspondence with the spacers 201 in the direction perpendicular to the first base 100. Therefore, the color changing blocks 131 only affect a transmission of a light at the spacers 201, thereby reducing an influence on a transmission of the incident light.

In some examples, the electrolytic sub-layer 111 includes a plurality of electrolytic blocks 141 arranged at intervals. The color changing sub-layer 121 includes the plurality of color changing blocks 131 arranged at intervals. An orthographic projection of each color changing block 131 on the first base 100 is within a range of an orthographic projection of one electrolytic block 141 on the first base 100. For example, the color changing blocks 131 are disposed on a side of the electrolytic blocks 141 proximate to the second substrate. Based on this, the direction of the electric field formed between the first electrode 11 and the second electrode 12 is controlled to be directed from the first substrate 10 to the second substrate 20. Due to the action of the electric field, ions released from the electrolytic blocks 141 after the electrolysis thereof move to the color changing blocks 131, causing the color changing blocks 131 to change color, such as black. The direction of the electric field formed by the first electrode 11 and the second electrode 12 is controlled to be directed from the second substrate 20 to the first substrate 10. Due to the action of the electric field, the electrolytic blocks 141 attract ions from the color changing blocks 131, causing the color changing blocks 131 to change color, such as transparent.

As another example, as shown in FIG. 6, the color changing blocks 131 are disposed on a side of the electrolytic blocks 141 away from the second substrate. Based on this, the direction of the electric field formed by the first electrode 11 and the second electrode 12 is controlled to be directed from the second substrate 20 to the first substrate 10. Due to the action of the electric field, ions released from the electrolytic blocks 141 after the electrolysis thereof move to the color changing blocks 131, causing the color changing blocks 131 to change color, such as black. The direction of the electric field formed by the first electrode 11 and the second electrode 12 is controlled to be directed from the first substrate 10 to the second substrate 20. Due to the action of the electric field, the electrolytic blocks 141 attract ions from the color changing blocks 131, causing the color changing blocks 131 to change color, such as transparent. The electrolytic blocks 141 reduce the influence on the transmission of the incident light.

In some embodiments, as shown in FIG. 6, the first substrate 10 further includes a first alignment layer 15 having a first rubbing alignment direction. For example, the first alignment layer 15 is located on a side of the first electrode 11 proximate to the second substrate 20.

The second substrate 20 further includes a second alignment layer 23 having a second rubbing alignment direction. For example, the second alignment layer 23 is located on a side of the third electrode 21 proximate to the first substrate 10. In some examples, a material of the first alignment layer 15 is the same as a material of the second alignment layer 23. For example, materials of the first alignment layer 15 and the second alignment layer 23 are both polyimide (PI).

For example, a deposition method is used in a process to form an alignment film on the side of the first electrode 11 proximate to the second substrate 20. A rubbing alignment method is used to rub the alignment film in a first rubbing direction to form the first alignment layer 15 with the first rubbing alignment direction. An alignment film is formed on the side of the third electrode 21 proximate to the first substrate 10. The rubbing alignment method is used to rub the alignment film in a second rubbing direction to form the second alignment layer 23 with the second rubbing alignment direction.

The first rubbing alignment direction is parallel to the second rubbing alignment direction, and during an alignment process, rubbing directions (i.e., the first rubbing direction and the second rubbing direction) of the first alignment layer 15 and the second alignment layer 23 are opposite. In this way, the liquid crystal molecules in the liquid crystal layer 30 disposed between the first alignment layer 15 and the second alignment layer 23 may be arranged at a certain pretilt angle in the rubbing directions. That is, the liquid crystal molecules in the liquid crystal layer 30 may be arranged in the same direction, and rotate in only one direction due to the action of the electric field.

For example, for an electronic device in a normally white mode, in a case where no power is applied, the liquid crystal molecules 302 in the liquid crystal layer 30 located between the first alignment layer 15 and the second alignment layer 23 are arranged at a certain pretilt angle in the vertical direction. That is, a long axis of the liquid crystal molecules 302 is arranged at a certain pretilt angle in the direction perpendicular to the first substrate 10 and the second substrate 20, so that the electronic device displays a white image. In addition, the liquid crystal molecules 302 are negative liquid crystal molecules. A short axis of the negative liquid crystal molecules has a larger dielectric constant than a long axis. Therefore, due to the action of the electric field direction perpendicular to the first substrate 10 and the second substrate 20, the negative liquid crystal molecules will rotate, so that the electronic device may display a black image.

Figure 7:
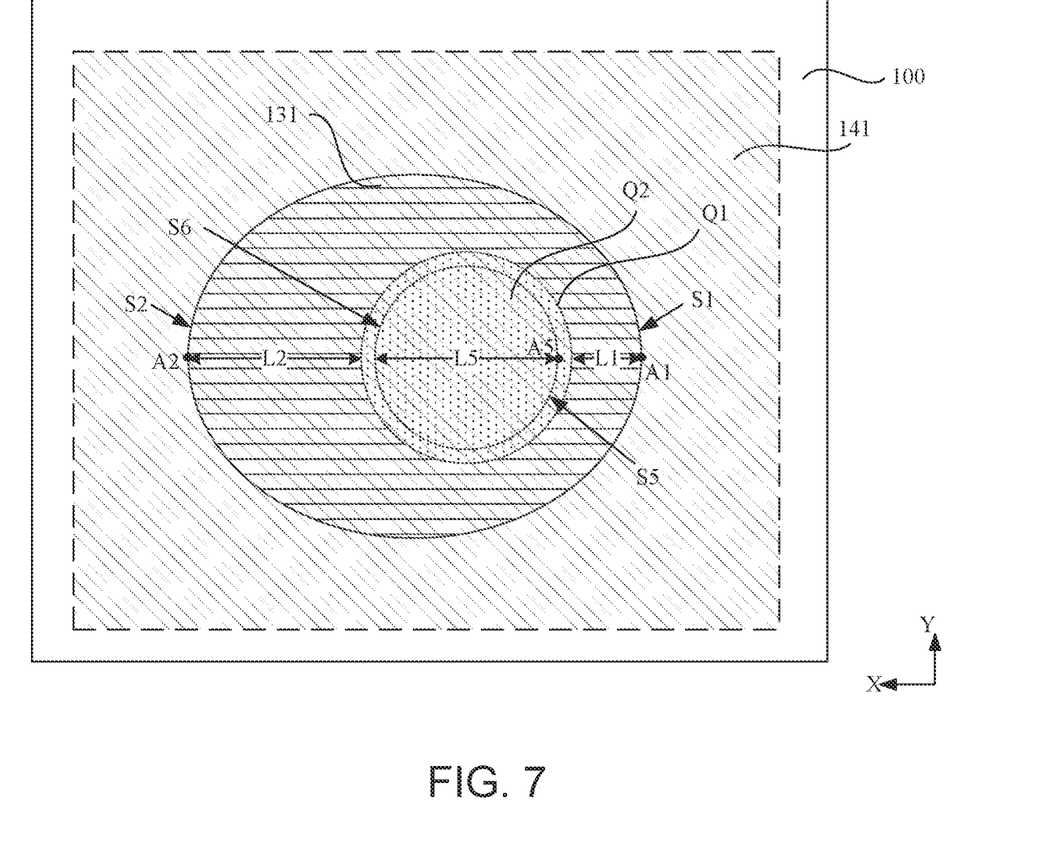
FIG. 7 is a top view of another liquid crystal cell, in accordance with some embodiments.

In some examples, as shown in FIG. 7, an orthographic projection of a surface of the spacer 201 proximate to the second base 200 on the first substrate 100 forms a first region Q1. An orthographic projection of the color changing block 131 on the first base 100 includes a first edge S1 and a second edge S2 that are opposite to each other in a second rubbing alignment direction X.

A first distance L1, in the second rubbing alignment direction X, between a first point A1 on the first edge S1 and an edge of the first region Q1 is less than a second distance L2, in the second rubbing alignment direction X, between a second point A2 on the second edge S2 and the first region Q1. Herein, the first point A1 is any point on the first edge S1, and a line connecting the first point A1 and the second point A2 is parallel to the second rubbing alignment direction X.

For example, as shown in FIG. 7, the first region Q1 is close to a circle. In the second rubbing alignment direction X, the first edge S1 is an arc-shaped edge of the orthographic projection of the color changing block 131 at one side of the first region Q1, and the second edge S2 is an arc-shaped edge of the orthographic projection of the color changing block 131 opposite to the first edge S1 at another side of the first region Q1.

In a process of forming the second alignment layer, that is, an alignment film is formed on the side of the third electrode 21 proximate to the first substrate 10, and in a process of rubbing the alignment film in the second rubbing direction, the spacer 201 protrudes toward the first substrate, so that a rubbing alignment of the second alignment layer is uneven. Therefore, when rubbing in the second rubbing direction, there will be a rubbing shadow phenomenon at the spacer 201. That is, in the second rubbing alignment direction X, an alignment effect of a region rubbed after passing the spacer 201 is lower than an alignment effect of a region rubbed before passing the spacer 201, so that at the spacer 201, a light leakage of the region rubbed after passing through the spacer 201 is more serious than the light leakage of the region rubbed before passing through the spacer 201. On this basis, the first distance L1 is less than the second distance L2, so that in the second rubbing alignment direction X, a cover range of the color changing block 131, in a direction perpendicular to the first substrate 10, to the region rubbed after passing the spacer 201 is greater than a cover range of the color changing block 131, in the direction perpendicular to the first substrate 10, to the region rubbed before passing the spacer 201. Therefore, when the color changing block 131 is black due to the action of the electric field, the light leakage at the region rubbed after passing the spacer 201 and the region rubbed before passing the spacer 201 may be avoided.

It will be noted that FIG. 7 only shows a positional relationship between one spacer 201 and one color changing block 131 corresponding thereto, and positional relationships between the remaining spacers 201 and color changing blocks 131 corresponding thereto are not shown. A person skilled in the art understand that the positional relationships between the remaining spacers 201 and the color changing blocks 131 corresponding thereto may be referred to FIG. 7, which will not be described here.

Figure 8:
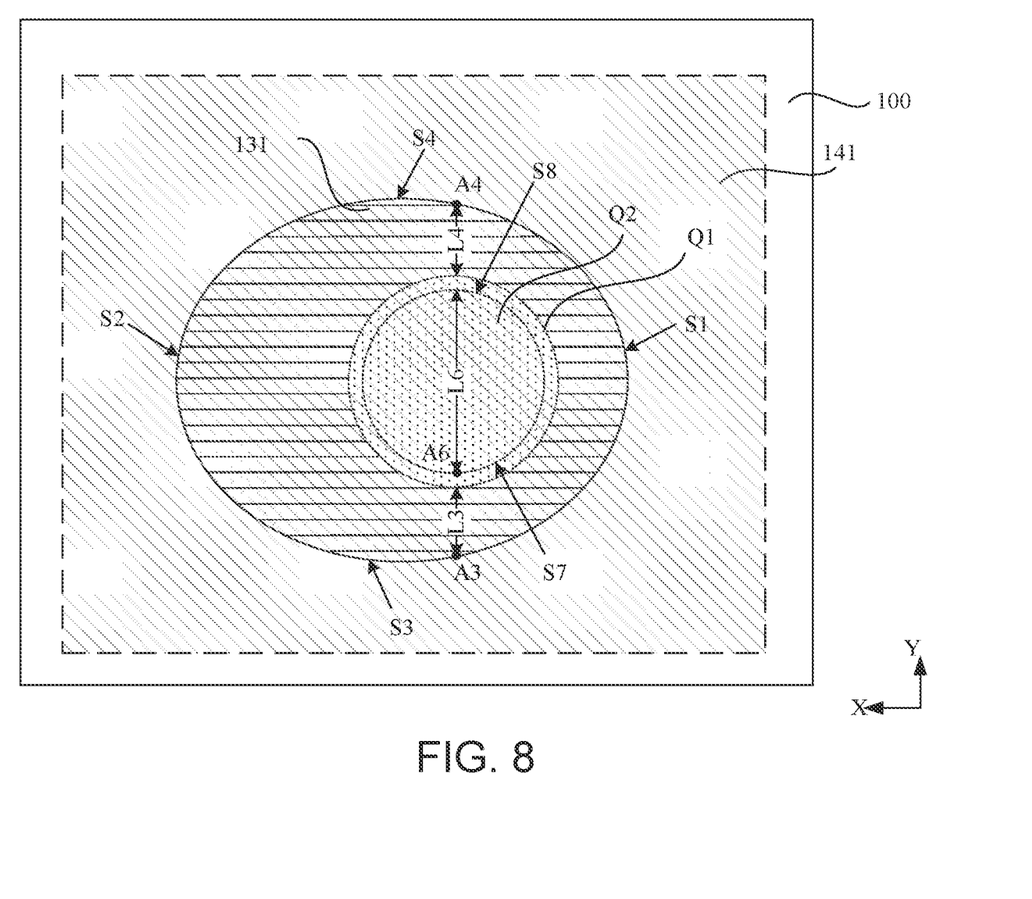
FIG. 8 is a top view of yet another liquid crystal cell, in accordance with some embodiments.

In some examples, as shown in FIG. 8, the orthographic projection of the color changing block 131 on the first base further includes a third edge S3 and a fourth edge S4 that are opposite to each other in a direction Y perpendicular to the second rubbing alignment direction. A third distance L3, in the direction Y perpendicular to the second rubbing alignment direction, between a third point A3 on the third edge S3 and the first region Q1 is equal to a fourth distance L4, in the direction Y perpendicular to the second rubbing alignment direction, between a fourth point A4 on the fourth edge S4 and the first region Q1. Herein, the third point A3 is any point on the third edge S3, and a line connecting the third point A3 and the fourth point A4 is perpendicular to the second rubbing alignment direction X.

For example, as shown in FIG. 8, the orthographic projection of the color changing block 131 on the first base 100 is close to a circle. In the direction Y perpendicular to the second rubbing alignment direction, the third edge S3 is an arc-shaped edge of the orthographic projection of the color changing block 131 at one side of the first region Q1, and the fourth edge S4 is an arc-shaped edge of the orthographic projection of the color changing block 131 opposite to the third edge S3 at another side of the first region Q1.

In this way, the third distance L3 is equal to the fourth distance L4, so that the color changing block 131 that is black due to the action of the electric field may block the light incident on a region where the spacer 201 is located in the direction Y perpendicular to the second rubbing alignment direction. Therefore, when the electronic device displays a black image, light leakage at the spacer 201 within a range in the direction Y perpendicular to the second rubbing alignment direction may be avoided.

In some examples, an orthographic projection of a surface of the spacer 201 away from the second base 200 on the first base 100 forms a second region. An area of the second region is less than or equal to an area of the first region Q1.

As shown in FIG. 7, the second region Q2 includes a fifth edge S5 and a sixth edge S6 that are opposite to each other in the second rubbing alignment direction X. There is a fifth distance L5, in the second rubbing alignment direction X, between a fifth point A5 on the fifth edge S5 and the sixth edge S6. The first distance L1 is greater than or equal to half of the fifth distance L5, and is less than or equal to the fifth distance L5. The second distance L2 is greater than or equal to the fifth distance L5, and is less than or equal to 1.5 times the fifth distance L5. Herein, the fifth point A5 is any point on the fifth edge S5. The fifth point A5, the first point A1 and the second point A2 are on a same straight line. That is, a line connecting the fifth point A5 and the first point A1, and a line connecting the fifth point A5 and the second point A2, are both parallel to the second rubbing alignment direction X.

Herein, it will be noted that the setting where the first distance L1 is less than or equal to the fifth distance L5 is only an example. As long as the first distance L1 is greater than or equal to half of the fifth distance L5, a maximum value of the first distance L1 is not limited, as long as a light transmission is not affected. Of course, on a basis of ensuring that the first distance L1 is greater than or equal to half of the fifth distance L5, the smaller the first distance L1 is, the better. In this way, in a case where the electronic device displays a white image, an influence of the electrochromic layer on a light transmittance may be reduced, and a display effect of the white image displayed by the electronic device may be improved.

Similarly, the setting where the second distance L2 is less than or equal to 1.5 times the fifth distance L5 is only an example. As long as the second distance L1 is greater than or equal to the fifth distance L5, a maximum value of the second distance L2 is not limited, as long as a light transmission is not affected.

For example, as shown in FIG. 7, the surface of the spacer 201 away from the second base 200 is close to a circle, so the second region Q2 is close to a circle. In the second rubbing alignment direction X, the fifth distance L5 between the fifth edge S5 and the sixth edge S6 is a diameter of the second region Q2. On this basis, the first distance L1 is greater than or equal to half of the diameter of the surface of the spacer 201 away from the second base 200, and is less than or equal to the diameter of the surface of the spacer 201 away from the second base 200. The second distance L2 is greater than or equal to the diameter of the surface of the spacer 201 away from the second base 200, and is less than or equal to 1.5 times the diameter.

In some examples, as shown in FIG. 8, the second region Q2 further includes a seventh edge S7 and an eighth edge S8 that are opposite to each other in the direction Y perpendicular to the second rubbing alignment direction. There is a sixth distance L6, in the direction Y perpendicular to the second rubbing alignment direction, between a sixth point A6 on the seventh edge S7 and the eighth edge S8. The third distance L3 is greater than or equal to half of the sixth distance L6, and is less than or equal to the sixth distance L6. Herein, the sixth point A6 is any point on the seventh edge S7. The fifth point A5, the third point A3 and the fourth point A4 are on a same straight line. That is, a line connecting the sixth point A6 and the third point A3, and a line connecting the sixth point A6 and the fourth point A4 are both perpendicular to the second rubbing alignment direction X.

Herein, it will be noted that the setting where the third distance L3 is less than or equal to the sixth distance L6 is only an example. As long as the third distance L3 is greater than or equal to half of the sixth distance L6, a maximum value of the third distance L3 is not limited, as long as a light transmission is not affected. Of course, on a basis of ensuring that the third distance L3 is greater than or equal to half of the sixth distance L6, the smaller the third distance L3 is, the better. In this way, in the case where the electronic device displays a white image, an influence of the electrochromic layer on a light transmittance may be reduced, and a display effect of the white image displayed by the electronic device may be improved.

For example, as shown in FIG. 8, the surface of the spacer 201 away from the second base 200 is close to a circle, so the second region Q2 is close to a circle. In the direction Y perpendicular to the second rubbing alignment, the sixth distance L6 between the seventh edge S7 and the eighth edge S8 is the diameter of the second region Q2. On this basis, the third distance L3 is greater than or equal to half of the sixth distance L6, and is less than or equal to the sixth distance L6. The third distance L3 is equal to the fourth distance L4, that is, the fourth distance L4 is also greater than or equal to half of the sixth distance L6, and is less than or equal to the sixth distance L6. That is, the third distance L3 and the fourth distance L4 are both greater than or equal to half of the diameter of the surface of the spacer 201 away from the second base 200, and is less than or equal to the diameter.

In some embodiments, as shown in FIGS. 1 and 5, the liquid crystal cell further includes a first signal line 16, a second signal line 17, and a third signal line 18 that are disposed on a side of the first substrate 10 proximate to the second substrate. For example, the first signal line 16, the second signal line 17 and the third signal line 18 are disposed on the side of the first base 100 proximate to the second substrate 20.

In some examples, the first signal line 16, the second signal line 17, and the third signal line 18 are in a same layer and have a same material, and are insulated from each other.

For example, the first signal line 16, the second signal line 17, and the third signal line 18 are all made of metal materials. In process, the first signal line 16, the second signal line 17, and the third signal line 18 are formed synchronously.

In some examples, the first substrate 3 includes a first electrode 11 and a second electrode 12. The second substrate 20 includes a third electrode 21. The first signal line 16 is electrically connected to the first electrode 11. The second signal line 17 is electrically connected to the second electrode 12. The first signal line 16 and the second signal line 17 are configured to transmit corresponding electrical signals to the first electrode 11 and the second electrode 12.

The third signal line 18 is electrically connected to the third electrode 21 through conductive adhesive 104 formed on the second substrate 20 by a coating process. The third signal line 18 is configured to transmit a corresponding electrical signal to the third electrode 21.

For example, the second electrode includes a plurality of sub-electrodes 13 arranged at intervals. The second signal line 17 is electrically connected to each sub-electrode 13 to transmit a same electrical signal to the plurality of sub-electrodes 13 at the same time.

For example, the conductive adhesive 104 is gold ball adhesive.

In some embodiments, as shown in FIGS. 1 to 6, the liquid crystal cell has a dimming region S and a peripheral region S'. In some examples, the peripheral region is disposed around the dimming region S. In some other examples, the peripheral region S' is located on only one side of the dimming region S. In yet some other examples, the peripheral region S' is located on two opposite sides of the dimming region S.

The liquid crystal layer 30 and the electrochromic layer 101 are located in the dimming region S.

The peripheral region S is used for wiring. For example, the first signal line 16, the second signal line 17, and the third signal line 18 are located in the peripheral region S'.

Some embodiments of the present disclosure provide an electronic device including at least one liquid crystal cell.

In some embodiments, the electronic device includes one liquid crystal cell. In an example, the electronic device is a liquid crystal display panel, and in another example, the electronic device is a dimming glass.

As shown in FIGS. 2 to 4, the liquid crystal layer 30 in the liquid crystal cell includes dichroic dyes 301, liquid crystal molecules 302, and a chiral agent (not shown in the figure). For example, the liquid crystal molecules 302 are negative liquid crystal molecules, and the dichroic dyes 301 are black dichroic dyes.

Arrangement directions of the dichroic dyes 301 and the liquid crystal molecules 302 are the same.

The chiral agent may make the dichroic dyes 301 and the liquid crystal molecules 302 have a plurality of arrangement directions. For example, when the liquid crystal cell is applied to a dimming glass adopting a VA-type normally white display mode, the liquid crystal molecules 302 are negative liquid crystal molecules, and the dichroic dyes 301 are black dichroic dyes. In a case where no voltage is applied to at least one of the first electrode 11 and the third electrode 13 on both sides of the liquid crystal layer 30, that is, in a case where the first electrode 11 and the third electrode 13 do not form an electric field, the dichroic dyes 301 and the liquid crystal molecules 302 are all arranged in a vertical direction. That is, the dichroic dyes 301 and the liquid crystal molecules 302 are perpendicular to the first substrate 10 and the second substrate 20, and the dimming glass displays a white image. In a case where voltages are applied to the first electrode 11 and the third electrode 13 on both sides of the liquid crystal layer 30, that is, in a case where the first electrode 11 and the third electrode 13 form an electric field that controls the liquid crystal layer 30, the dichroic dyes 301 and the liquid crystal molecules 302 are arranged in a horizontal direction due to the action of an electric field. That is, the dichroic dyes 301 and the liquid crystal molecules 302 are parallel to the first substrate 10 and the second substrate 20, and have a plurality of horizontal arrangement directions, so that the incident light from various directions may be absorbed, so that the dimming glass displays a black image, to realize an intelligent dimming function of the dimming glass.

In some other embodiments, the electronic device includes two liquid crystal cells disposed in a stack, and the liquid crystal layer 30 in the liquid crystal cell includes dichroic dyes 301 and liquid crystal molecules 302. For example, the two liquid crystal cells are connected by adhesive. For example, a side of the second base 200 of one liquid crystal cell away from the first substrate 10 is coated with adhesive, and a side of the first base 100 of the other liquid crystal cell away from the second substrate 20 is contact with the adhesive, so that the two liquid crystal cells are stacked. As another example, a side of the first base 100 of the liquid crystal cell away from the second substrate 20 is coated with adhesive, and a side of the second base 200 of the other liquid crystal cell away from the first substrate 10 is contact with the adhesive, so that the two liquid crystal cells are stacked.

For example, first signal lines 16, second signal lines 17, and third signal lines 18 in the two liquid crystal cells are respectively connected to a same signal terminal. That is, a first signal line 16 in one liquid crystal cell and a first signal line 16 in the other liquid crystal cell are connected to a same first signal terminal. A second signal line 17 in one liquid crystal cell and a second signal line 17 in the other liquid crystal cell are connected to a same second signal terminal. A third signal line 18 in one liquid crystal cell and a third signal line 18 in the other liquid crystal cell are connected to a same third signal terminal. In other words, liquid crystal layers 30 in the two liquid crystal cells are subjected to a same electric field effect. Electrochromic layers in the two liquid crystal cells are subjected to a same electric field effect.

A first rubbing alignment direction of a first alignment layer of one liquid crystal cell is perpendicular to a first rubbing alignment direction of a first alignment layer of the other liquid crystal cell. In each liquid crystal cell, a first rubbing alignment direction of a first alignment layer is parallel to a second rubbing alignment direction of the second alignment layer. Therefore, a second rubbing alignment direction of a second alignment layer of one liquid crystal cell and a second rubbing alignment direction of a second alignment layer of the other liquid crystal cell are also perpendicular to each other.

In the following, for a convenience of description, the two liquid crystal cells are respectively denoted as a first liquid crystal cell and a second liquid crystal cell.

Considering the dimming glass with a VA-type normally white display mode as an example, in a case where the electrochromic layers 101 in the dimming glass are transparent due to the action of the electric field, and the liquid crystal layers 30 in the dimming glass are not subjected to the action of the electric field, the liquid crystal molecules 301 and the dichroic dyes 302 in the liquid crystal layers 30 of the first liquid crystal cell and the second liquid crystal cell are all arranged in the direction perpendicular to the first substrate 10 and the second substrate 20. The incident light may pass through the electrochromic layers 101 and the liquid crystal layers 30, so that the dimming glass displays a white image.

In a case where the electrochromic layers 101 in the first liquid crystal cell and the second liquid crystal cell is black due to an action of another electric field, and the liquid crystal molecules 301 and the dichroic dyes 302 in the liquid crystal layers 30 of the first liquid crystal cell and the second liquid crystal cell are arranged in a direction parallel to the first substrate 10 and the second substrate 20 due to the action of the electric field, since the first rubbing alignment directions of the first alignment layers in the first liquid crystal cell and the second liquid crystal cell are perpendicular to each other, the pretilt angles of the liquid crystal molecules 301 in the liquid crystal layers 30 of the first liquid crystal cell and the second liquid crystal cell are perpendicular to each other, so that long axes of the liquid crystal molecules 301 in the liquid crystal layers 30 of the first liquid crystal cell and the second liquid crystal cell are perpendicular to each other on a plane parallel to the first substrate 10 and the second substrate 20. The dichroic dyes 302 in each liquid crystal cell are in a same direction as the liquid crystal molecules 301 in a same liquid crystal cell. That is, long axes of the dichroic dyes 302 in the liquid crystal layers 30 of the first liquid crystal cell and the second liquid crystal cell are perpendicular to each other on the plane parallel to the first substrate 10 and the second substrate 20.

In this way, after an incident light from a side of the first liquid crystal cell away from the second liquid crystal cell enters the first liquid crystal cell, the incident light not blocked by the electrochromic layer 101 in the first liquid crystal cell enters the liquid crystal layer in the first liquid crystal cell 30. The dichroic dyes 302 in the first liquid crystal cell absorbs the incident light whose polarization direction is parallel to its long axis direction; and the incident light whose polarization direction is perpendicular to a long axis direction of the dichroic dyes 302 can pass through the liquid crystal layer in the first liquid crystal cell, and enter the second liquid crystal cell. The long axis direction of the dichroic dyes 302 in the second liquid crystal cell is perpendicular to the long axis direction of the dichroic dyes 302 in the first liquid crystal cell. Therefore, after the incident light that is not blocked by the electrochromic layer 101 in the second liquid crystal cell enters the liquid crystal layer 30 in the second liquid crystal cell, this incident light is absorbed by the dichroic dyes 302 in the second liquid crystal cell, so that the diming glass displays a black image.

In the embodiments of the present disclosure, when the dimming glass displays a black image, it means that the dimming glass is black glass. When the dimming glass displays a white image, it means that the dimming glass is transparent glass.

In some embodiments, the electronic device further includes an flexible printed circuit (FPC) electrically connected to the liquid crystal cell(s). In a bonding region D (as shown in FIG. 1) on a side of the peripheral region S', the first signal line 16, the second signal line 17, and the third signal line 18 may be bonded and connected with the FPC.

Some embodiments of the present disclosure provide a method for manufacturing a liquid crystal cell, including S01 to S12.

In S01, referring to FIG. 1, a metal material is deposited on a first base 100 to form a metal film. The metal film is exposed, developed, and etched to obtain a first signal line 17, a second signal line 18 and a third signal line 19 located in a peripheral region S'. For example, the first base 100 is a glass base.

In S02, referring to FIG. 2, a transparent conductive material (such as ITO) is deposited on the first base 100 to form a transparent conductive film, and the transparent conductive film is exposed, developed, and etched to form a second electrode 12.

In S03, an electrochromic layer 101 is formed on the second electrode 12.

In some examples, the electrochromic layer 101 includes an electrolytic sub-layer 111 and a color changing sub-layer 121. A material (e.g., solid electrolyte) for forming the electrolytic sub-layer 111 is first deposited on the second electrode 12 to form an electrolytic film, and the electrolytic film is exposed, developed, and etched to form the electrolytic sub-layer 111; then, a material (e.g., PANI) for forming the color changing sub-layer 121 is deposited on the electrolytic sub-layer 111 to form a color changing film, and the color changing film is exposed, developed, and etched to form the color changing sub-layer 121.

In some other examples, the electrolytic sub-layer 111 includes a plurality of electrolytic blocks 141, and the color changing sub-layer 121 includes a plurality of color changing blocks 131. Referring to FIG. 6, a material for forming the color changing blocks 131 is deposited on the second electrode 12 to form a color changing film, and the color changing film is exposed, developed, and etched to form the plurality of spaced color changing blocks 131. The material for forming the electrolytic blocks 141 is deposited on the color changing blocks 131 to form an electrolytic film, and the electrolytic film is exposed, developed, and etched to form the electrolytic blocks 141.

In S04, referring to FIG. 6, an insulating material is deposited on the electrochromic layer 101 to form an insulating layer 102.

In S05, referring to FIG. 6, a transparent conductive material (such as SiNx) is deposited on the insulating layer 102 to form a transparent conductive film, and the transparent conductive film is exposed, developed, and etched to form a first electrode 11.

In S06, referring to FIG. 2, a side of the first electrode 11 away from the second electrode 12 is coated with an organic material (such as PI) to form an organic film, and the organic film is rubbed in a first rubbing direction to form a first alignment layer 15 with a first rubbing alignment direction.

In S07 referring to FIG. 2, a transparent conductive material (such as ITO) is deposited on a second base 200 to form a third electrode 21. For example, the second base 200 is a glass base.

In S08, referring to FIG. 2, a material of spacers 201 to be formed is deposited on the third electrode 21 and formed into a film. Through exposure, development, and etching, a plurality of spaced post spacers 201 are formed.

In S09, in the second substrate 20, a side of the third electrode 21 away from the second base 200 is coated with an organic material (such as PI) to form an organic film. The organic film in the second substrate 20 is rubbed in a second rubbing direction to form a second alignment layer 23 with a second rubbing alignment direction in the second substrate 20.

In S10, the second substrate 20 is coated with frame sealant 103 and conductive adhesive 104. Referring to FIG. 1, the frame sealant 103 is located in the peripheral region S' and at least surrounds a dimming region S. The conductive adhesive 103 is located in the peripheral region S'.

For example, the frame sealant 103 is silicon ball adhesive.

In S11, the dichroic dyes 301 and the liquid crystal molecules 302 are dripped on the first alignment layer 15 of the first substrate 10 to form a liquid crystal layer 30.

In S12, the first substrate 10 and the second substrate 20 are aligned into a cell to form the liquid crystal cell.

Both the spacers 201 and the frame sealant 103 mentioned above may play a supporting role in the liquid crystal cell.

It will be noted that S01 to S06 are manufacturing steps of the first substrate 10, and S07 to S10 are manufacturing steps of the second substrate 20. For example, a manufacturing process of the first substrate 10 and a manufacturing process of the second substrate 20 may be performed at a same time.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:
1. A liquid crystal cell, comprising:
a first substrate, including:
  a first base;
  an electrochromic layer disposed on a side of the first base; and
  a first alignment layer having a first rubbing alignment direction;
a second substrate, including:
  a second base;
  a plurality of spacers arranged at intervals and disposed on a side of the second base proximate to the first substrate; an orthographic projection of at least one spacer of the plurality of spacers arranged at intervals on the first base being within a range of an orthographic projection of the electrochromic layer on the first base; and
  a second alignment layer having a second rubbing alignment direction, the first rubbing alignment direction being parallel to the second rubbing alignment direction; and
a liquid crystal layer disposed between the first substrate and the second substrate, wherein
the electrochromic layer includes an electrolytic sub-layer and a color changing sub-layer arranged in different layers; an orthographic projection of the color changing sub-layer on the first base is within a range of an orthographic projection of the electrolytic sub-layer on the first base;

the color changing sub-layer includes a plurality of color changing blocks arranged at intervals;

an orthographic projection of each spacer on the first base is within a range of an orthographic projection of one color changing block on the first base;

an orthographic projection of a surface of the spacer proximate to the second base on the first base forms a first region; and the orthographic projection of the color changing block on the first base includes a first edge and a second edge that are opposite to each other in the second rubbing alignment direction;

a first distance, in the second rubbing alignment direction, between a first point on the first edge and the first region is less than a second distance, in the second rubbing alignment direction, between a second point on the second edge and the first region; a line connecting the first point and the second point is parallel to the second rubbing alignment direction.

2. The liquid crystal cell according to claim 1, wherein the first substrate further includes a first electrode and a second electrode in different layers and insulated from each other; the first electrode is disposed on a side of the electrochromic layer proximate to the second substrate; the second electrode is disposed on a side of the electrochromic layer away from the second substrate; orthographic projections of the first electrode and the second electrode on the first base overlap; and the second substrate further includes a third electrode; orthographic projections of the third electrode and the first electrode on the first base overlap.

3. The liquid crystal cell according to claim 2, wherein an orthographic projection of the second electrode on the first base is within a range of an orthographic projection of the first electrode on the first base.

4. The liquid crystal cell according to claim 2, wherein the second electrode includes a plurality of sub-electrodes arranged at intervals.

5. The liquid crystal cell according to claim 4, wherein an orthographic projection of each spacer on the first base is within a range of an orthographic projection of one sub-electrode on the first base.

6. The liquid crystal cell according to claim 1, wherein the electrolytic sub-layer includes a plurality of electrolytic blocks arranged at intervals; and an orthographic projection of each color changing block on the first base is within a range of an orthographic projection of one electrolytic block on the first base.

7. The liquid crystal cell according to claim 1, wherein the color changing sub-layer is disposed on a side of the electrolytic sub-layer away from the first base.

8. The liquid crystal cell according to claim 1, wherein the orthographic projection of the color changing block on the first base further includes a third edge and a fourth edge that are opposite to each other in a direction perpendicular to the second rubbing alignment direction; a third distance, in the direction perpendicular to the second rubbing alignment direction, between a third point on the third edge and the first region is equal to a fourth distance, in the direction perpendicular to the second rubbing alignment direction, between a fourth point on the fourth edge and the first region; a line connecting the third point and the fourth point is perpendicular to the second rubbing alignment direction.

9. The liquid crystal cell according to claim 1, wherein an orthographic projection of a surface of the spacer away from the second base on the first base forms a second region; an area of the second region is less than or equal to an area of the first region; the second region includes a fifth edge and a sixth edge that are opposite to each other in the second rubbing alignment direction;

the first distance is greater than or equal to half of a fifth distance, in the second rubbing alignment direction, between a fifth point on the fifth edge and the sixth edge, and is less than or equal to the fifth distance; the fifth point, the first point, and the second point are on a same straight line; and the second distance is greater than or equal to the fifth distance, and is less than or equal to 1.5 times the fifth distance.

10. The liquid crystal cell according to claim 9, wherein the second region further includes a seventh edge and an eighth edge that are opposite to each other in the direction perpendicular to the second rubbing alignment direction; and the third distance is greater than or equal to half of a sixth distance, in the direction perpendicular to the second rubbing alignment direction, between a sixth point on the seventh edge and the eighth edge, and is less than or equal to the sixth distance; the sixth point, the third point and the fourth point are on a same straight line.

11. The liquid crystal cell according to claim 1, wherein the liquid crystal layer includes dichroic dyes and liquid crystal molecules.

12. The liquid crystal cell according to claim 11, wherein the liquid crystal layer further includes a chiral agent.

13. An electronic device, comprising at least one liquid crystal cell, wherein the at least one liquid crystal cell includes:

a first substrate, including:
a first base; and
an electrochromic layer disposed on a side of the first base;
a second substrate, including:
a second base; and
a plurality of spacers arranged at intervals and disposed on a side of the second base proximate to the first substrate; an orthographic projection of at least one spacer of the plurality of spacers arranged at intervals on the first base being within a range of an orthographic projection of the electrochromic layer on the first base; and
a liquid crystal layer disposed between the first substrate and the second substrate;

wherein the at least one liquid crystal cell includes two liquid crystal cells arranged in a stack;

in each liquid crystal cell of the two liquid crystal cells, a first substrate includes a first alignment layer having a first rubbing alignment direction, and a second substrate includes a second alignment layer having a second rubbing alignment direction; and the first rubbing alignment direction of the first alignment layer in the liquid crystal cell is parallel to the second rubbing alignment direction of the second alignment layer; and a first rubbing alignment direction of a first alignment layer of one liquid crystal cell is perpendicular to a first rubbing alignment direction of a first alignment layer of another liquid crystal cell.

14. The electronic device according to claim 13, wherein a liquid crystal layer in the liquid crystal cell includes dichroic dyes and liquid crystal molecules.

* * * * *